Figure 1:
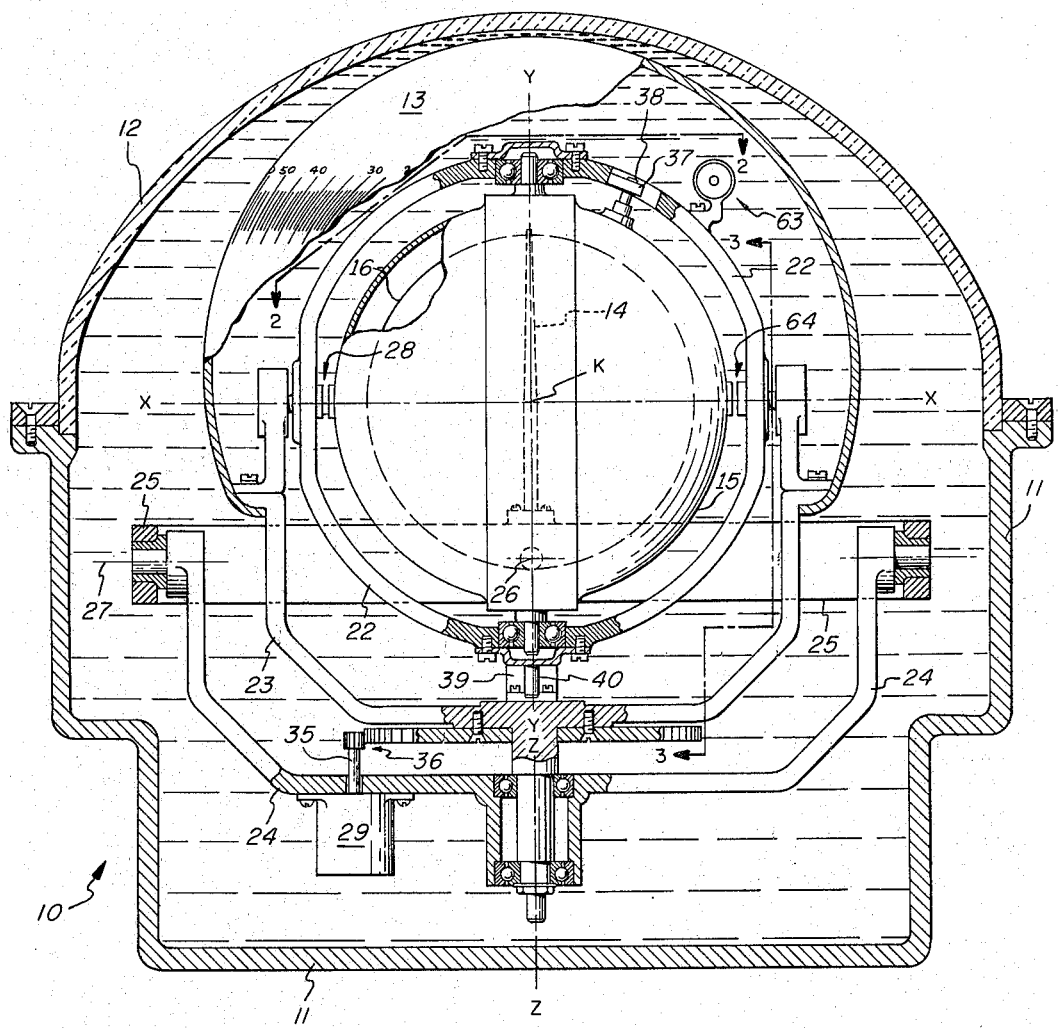

INVENTOR.
RICHARD G. BRUGGER
BY Arthur H. Serrell
ATTORNEY

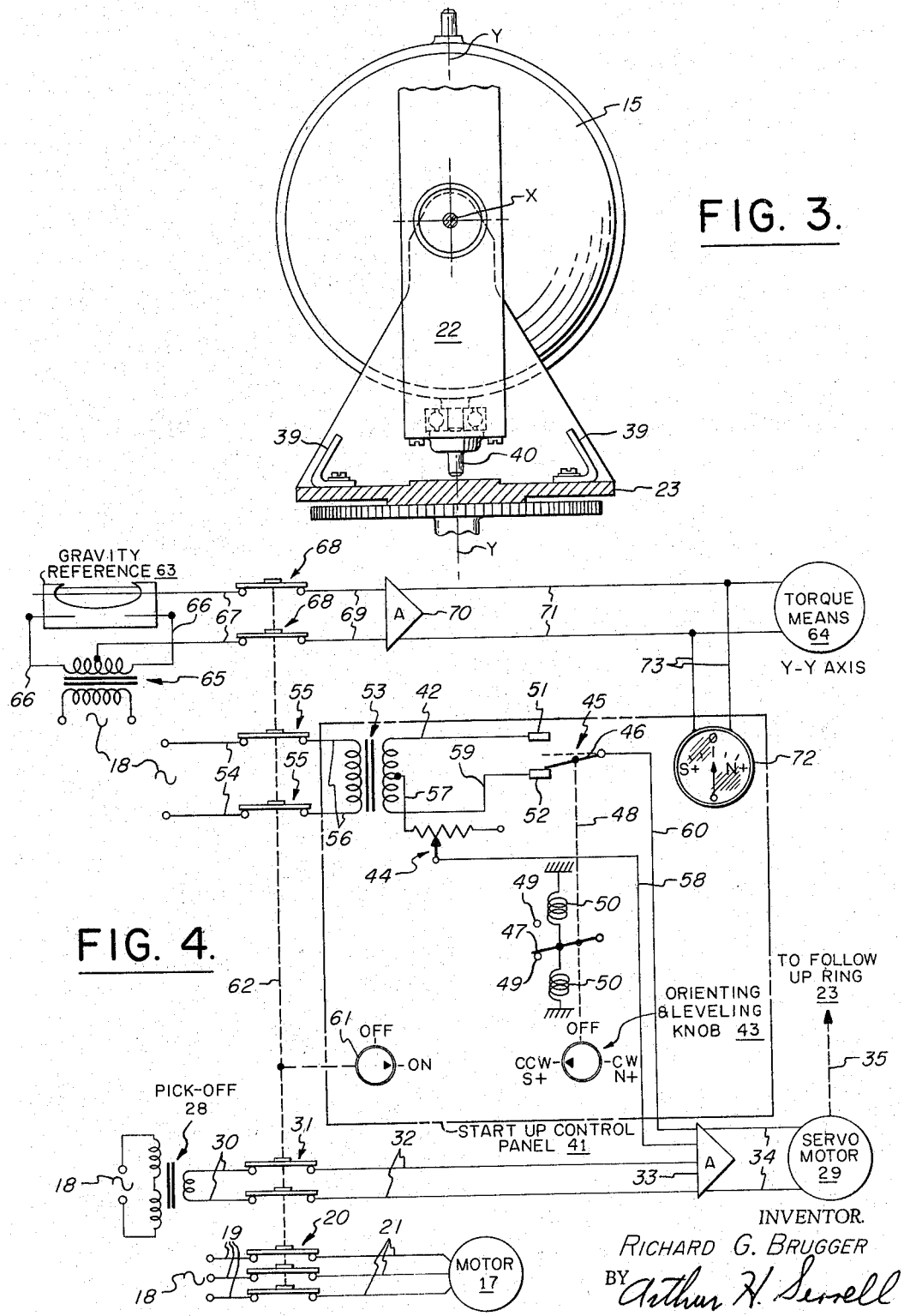

United States Patent Office 3,290,787
Patented Dec. 13, 1966

3,290,787
GYROSCOPIC COMPASSES
Richard G. Brugger, Hempstead, N.Y., assignor to Sperry Rand Corporation, Great Neck, N.Y., a corporation of New York
Filed June 27, 1963, Ser. No. 291,134
10 Claims. (Cl. 33—226)

This invention relates to an improvement in gyroscopic compasses of the miniaturized type having particular utility in vehicles movable on the land that require quick orientation and levelling of the directive element under start-up conditions.

The primary object of the present invention is to obtain this result in gyroscopic compasses with the gyroscopic rotor of the compass spinning and without temporarily opening the follow-up circuit connecting the servomotor driven followup ring to the directive member or otherwise rendering the normal follow-up controls ineffective when the components of the compass are initially energized. The start-up control provided in the improved gyroscopic compass structure shown in U.S. Letters Patent No. 2,887,784, issued May 26, 1959, to Leslie F. Carter requires a caging mechanism to set the cased directive member of the instrument on the meridian before energy is supplied to spin the rotor under starting conditions. In the levelling operation of the Carter compass, it is also necessary to disconnect the follow-up controls between the directive member and the follow-up ring by opening a circuit to the servomotor connected to drive the follow-up ring. In the improved compass, the orienting and levelling operations occur after energization of the components with the rotor up to speed, with the normal follow-up controls effective and without caging the directive member.

One of the features of the invention is provided by the means included in the improved compass for supplying a reversible biasing input to the servomotor of the follow-up means to effect relative displacement between the directive member and the follow-up ring.

Another feature of the invention resides in the inclusion on the gyroscopic compass structure of normally ineffective means for precessing the directive member about the axis of the gimbal on which it is supported that is rendered effective by the displacement between the parts caused by the biasing input.

Still another feature of the invention is provided in the second normally ineffective means included in the compass structure for precessing the directive member to an oriented condition about its axis, this means being rendered sequentially effective as a result of the initial precession of the member about its gimbal axis.

Still a further feature of the invention resides in inclusion in the compass structure of a means that is operable upon reversal of the biasing input to the follow-up servomotor for levelling the oriented directive member about the horizontal axis of the gimbal on which it is mounted.

Figure 2:
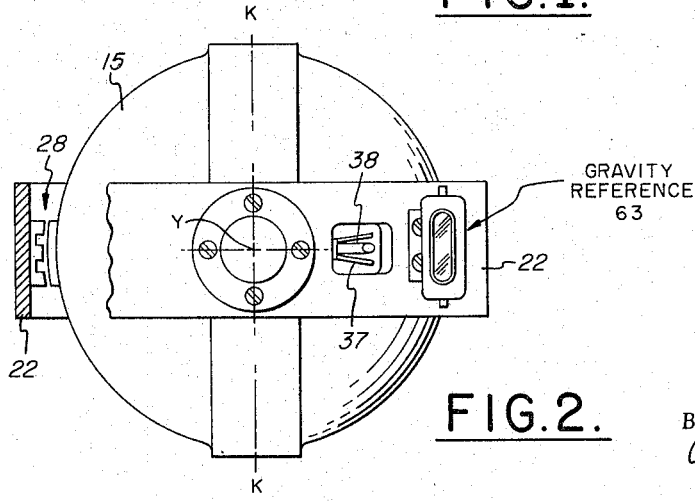

Other objects, features and structural details of the invention will be apparent from the following description with relation to the accompanying drawings in which:

FIG. 1 is an elevational view of a gyroscopic compass structure embodying the present invention looking in a north direction along the normally horizontal north-south spin axis of the rotor of the directive member, FIG. 2 is a sectional view taken on line 2—2 in FIG. 1, FIG. 3 is a sectional view taken on line 3—3 in FIG. 1, and FIG. 4 is a schematic view and circuit diagram showing the start-up control panel and the connections between the electrical components of the improved gyro compass.

As shown in FIG. 1, the binnacle 10 of the improved compass includes a frame or base 11 and a connected transparent dome 12 that provide a fluid filled container within which the operating parts of the compass are located. As the compass represented in the drawing is a direct reading type, the parts include a compass card 13 and lubber line 14 that are viewed by the human operator through the dome 12 in observing the heading of the craft or vessel on which the device is used. The base 11 of the binnacle may accordingly be suitably mounted on the instrument panel of the craft or vessel in front of the human operator to move with the craft or vessel as its heading is changed.

The directive member of the improved gyroscopic compass is indicated as a hollow sphere 15 having a gyroscopic rotor 16 therein spinning about a normally horizontal axis K—K in a north-south direction, FIGS. 1 and 2. The means provided to drive the gyroscopic rotor 16 is shown in FIG. 4 as a suitable electric motor 17 that is energized from an A.C. source 18 by way of leads 19, a gang switch 20 shown in closed circuit condition and leads 21.

The directed member or sphere 15 of the improved gyroscopic compass in connected to the base 11 through a system of gimbals that includes gimbal 22 on which the member 15 is mounted with freedom about a normally vertical axis Y—Y. In the arrangement shown, the system includes a follow-up ring 23 on which the gimbal 22 is mounted with freedom about a normally horizontal axis X—X that is directed east-west. The ring 23, gimbal 22 and member 15 are further pendulously and universally connected to the base 11 of the binnacle 10 through a connected yoke 24 and gimbal 25 with the axes of the connection being mutually perpendicular and normally horizontal. In FIG. 1, the horizontal axis of the gimbal 25 in relation to the base 11 is indicated at 26. The axis of the pendulous yoke 24 in relation to the gimbal 25 is indicated at 27. In the described system, the follow-up ring is mounted with relation to the yoke 24 or the base frame 11 to move about a normally vertical axis Z—Z. Under normal operating conditions, the axes Z—Z and Y—Y are in alignment. In the disclosure and claims, it will be understood that "the axis," otherwise unspecified, of the member 15, the gimbal 22, the ring 23, and the frame 24, refers to the mounting axis of the named member.

In the gyro compass structure shown in FIG. 1, the card component 13 is suitably fixed to the vertical follow-up ring 23 which is slaved to the directive member 15 by conventional follow-up means. The lubber line 14 of the compass is provided by an arm that is fixedly attached at its end to the gimbal 25. Accordingly, as the gimbal 25 and base 11 move together with the craft as it changes heading the lubber line 14 moves with respect to the compass card 13 to change the directional indication of the device. The card 13 slaved to the directive member 15 maintains its azimuthal orientation in accordance with the north-south directed spin axis K—K of the rotor 16 of the device. In the described gimbal system, the member 15 is neutrally supported by the fluid with its center of gravity and center of buoyancy at the intersection of the axes K—K, Y—Y and X—X and with the weight loading on the bearings of the system relieved. The gimbal 25 and yoke 24 structure isolates the supported compass components from the vessel or craft on which the binnacle 10 is mounted so that the normally vertical axes Y—Y and Z—Z do not become inclined to the vertical when the vessel or craft tilts from a level condition.

The improved gyroscopic compass includes conventional follow-up means for moving the ring 23 in follow-up relation to the directive member 15. As shown in FIGS. 1 and 2, this structure includes an electromagnetic pick-off 28 of the E-type having a wound stator part fixed to the ring 22 and an armature part fixed to the member 15. Pick-off 28 produces an electrical output that is dependent in amplitude and phase on the magnitude and sense of the departure of the ring 22 and member 15 from an oriented condition. In the circuit shown in FIG. 4, the pick-off 28 is energized from the A.C. source 18 and its output controls the operation of a servomotor 29.

The circuit connecting the pick-off 28 to the servomotor 29 includes leads 30, a gang switch 31 shown in closed condition, leads 32, an amplifier 33 and leads 34. The servomotor 29 of the arrangement represented is mounted on the yoke 24 and its output shaft 35 is operatively connected to the follow-up ring 23 through suitable reduction gearing 36. In the operation of the follow-up means, the servomotor 29 moves the ring 23 in accordance with the output of the pick-off 28 to maintain the orientation between the ring 23 and the directed member 15 of the device.

In accordance with the present invention, the improved device includes first normally ineffective means for precessing the member 15 about the gimbal axis X—X. To produce the tilt required in the orienting operation of the device under start-up conditions, respective spring 37 and stop 38 parts are located on the respective ring 22 and member 15 components in normally angularly displaced engageable relation. In the improved gyroscopic compass, a biasing input to the follow-up means effects displacement of the ring 23 with respect to the member 15 to engage the stop 38 with one of the springs 37 and accordingly obtain a torque about the axis Y—Y of the member 15. This results in the precession of the member 15 about the gimbal axis X—X as required initially in the orienting operation to obtain the desired result. The direction of the tilt of the Y—Y axis of member 15 is determined by means hereinafter described.

The improved structure also includes second normally ineffective means for precessing the member 15 about its axis Y—Y. This result is obtained by providing an orienting torque about the axis X—X of the gimbal 22. Here, the structure shown in FIGS. 2 and 3 includes respective spring 39 and stop 40 parts which are located in normally angularly displaced engageable relation on the gimbal 22 and ring 23 components of the device. Accordingly, in the orienting operation as the member 15 tilts with gimbal 22 about axis X—X, the stop 40 reaches a position at which it engages one of the springs 39 to produce the torque about axis X—X required to precess the member about axis Y—Y to an oriented condition when the device is started up. Here, the sense of precession of the member 15 about axis Y—Y depends on which of the spaced springs 39 on the ring 23 that the stop 40 engages.

To provide biasing for the output of the pick-off 28 of the follow-up means required to displace the spring and stop parts on the gimbal 22 and member 15 and on the ring 23 and gimbal 22 into engagement sequentially, the improved device includes biasing input means in the form of a circuit shown in FIG. 4, that is energized from source 18 to provide a bias signal that is series mixed with the pick-off signal input to amplifier 33 to control the servomotor 29. As shown, the controls for the bias input circuit are located on a start-up control panel 41. The panel 41 may be an integral part of the binnacle 10 or may be located on the instrument panel of the vessel or craft in a position thereon where the human operator is able to view the card 13 and lubber line 14 of the device as well as adjust an orienting knob 43. In the arrangement shown in FIG. 4, the magnitude of the bias signal is calibrated by adjustment of the slider of a potentiometer 44. Knob 43 on the panel 41 operates the manually movable part of a reversing switch 45 that is normally spring biased to an open condition represented by dotted lines in the drawings. In the circuit shown in FIG. 4, the movable blade of the switch 45 is indicated at 46. The blade 46 is connected to a spring centered arm 47 and to the knob 43 by way of shafting 48. Spaced stops 49 limit the motion of the arm 47 and the centering springs 50 connected to the arm 47 return the blade 46 to its open condition when the operator releases the knob 43. In the orienting operation, the operator moves the knob manually clockwise to the clockwise indicia (CW–N+) on the panel 41 or counterclockwise to the counterclockwise indicia (CCW–S+) on the panel 41 to move the card 13 to a known condition of orientation with respect to the lubber line 14. In FIG. 4, the knob 43 is shown turned to the counterclockwise indicia to initiate the orienting operation by providing the necessary biasing input to the follow-up means to effect counterclockwise motion of the card 13. The components of the device shown in FIGS. 1, 2 and 3 are represented in normal operational condition before the engagement of the respective spring and stop precessing parts. The alternately closed contact terminals of the switch 45 are respectively indicated at 51 and 52.

In the bias circuit shown in FIG. 4 connecting the source 18 to the amplifier 33, the primary of a transformer 53 is energized from source 18 by way of leads 54, a gang switch 55 shown in closed circuit condition and leads 56. One end of the resistor of the potentiometer 44 is connected by lead 57 to a center-tapped position on the secondary of the transformer 53. The slider of the potentiometer 44 is connected to amplifier 33 by lead 58. Contact 51 of switch 45 is connected to one end of the secondary of the transformer 53 by a lead 42. The other end of the secondary of the transformer is connected to the alternative contact 52 of switch 45 by lead 59. Also lead 60 connects the blade 46 of switch 45 to the amplifier 33. In the condition of the parts shown in FIG. 4, the orienting knob 43 is represented as held in the position in which the blade 46 engages contact 52 to close the circuit to provide the input to the servomotor by way of amplifier 33 required to effect counterclockwise precession of the card 13 in relation to the relatively fixed lubber line 14. In operation, the described circuit renders the first and second of the described spring and stop precessing means effective sequentially to precess the member 15 to a tilted condition initially about the gimbal axis X—X and to precess the member 15 to an oriented condition secondly about its Y—Y axis. Here, the biasing input in effect changes the null point of pick-off 28 so that the ring 23 is displaced sufficiently from the member 15 to engage the stop 38 with one of the springs 37 and with the follow-up means causing the card 13 and ring 23 to move in the same direction as the member 15 is precessed to an oriented condition. The actual orientation of the craft with respect to north is known when the device is started up, and the error in the reading of the card and lubber line is reduced to zero by the human operator in holding the orienting knob 43 so that the switch 45 is closed in one or the other of its operative conditions. As shown in FIG. 4, the panel 41 also includes an off-on knob 61 connected by shafting 62 to the blades of the ganged switches 20, 31 and 55. In operation of the device, it will be understood that the knob 61 is first set to the on position so that energy is provided the transformer 53, the amplifier 33 and the spinning motor 17. To stop the motion of the card 13 as it approaches correct orientation with the lubber line, the human operator observing the card reverses the biasing input by turning knob 43 to the clockwise position shown at CW in FIG. 4 to close the circuit with blade 46 engaging the terminal 51 of the switch. This reverses the engagement of the stop 38 with springs 37 and precesses the stop 40 out of engagement with the spring 39 effecting the counterclockwise orientation. Upon reversal of the knob 43 in the described operation to the clockwise position (CW) the reversibly engaged stop 38 and springs 37 exert a torque about the Y—Y axis that levels the oriented member 15 about the gimbal axis X—X. The described biasing input means orients as well as levels the member 15 under start-up conditions, the levelling means being operable upon reversal of the input effecting the orientation of the member.

Further means are included in the improved compass structure for levelling the member about gimbal axis X—X. As shown in FIGS. 1, 2 and 4, this structure includes a gravity reference 63 in the form of an electrolytic level that is fixedly mounted on gimbal 22 to detect tilt about the gimbal axis X—X. The electrical output of the level 63 is dependent on the tilt condition of the member 15 and the gimbal 22 about axis X—X. To exert the further levelling torque about the axis Y—Y of the member 15, the structure includes Y—Y axis torquing means 64 having a stator part fixedly connected to the gimbal 22 and an armature part fixedly connected to the member 15. In the circuit shown in FIG. 4 connecting the reference 63 to the means 64, an electrical input to the level 63 is provided from source 18 through a transformer 65 and leads 66 connecting the respective ends of the secondary winding of the transformer to the respective spaced terminals of the level. The output of the level 63 is carried by leads 67 respectively to the third terminal of the level and to a center tap position on the secondary of the transformer 65, a gang switch 68 shown in closed circuit condition, leads 69, amplifier 70 and leads 71. The blades of the switch 68 move with the shafting 62 connected to the off-on knob 61 on the control panel 41. A level indicator 72 of the null type controlled by the output of the amplifier 70 by way of connecting leads 73 is included on the start-up control panel 41 of the device. Here, the levelling of the oriented member 15 about axis X—X is observed by the human operator on the panel indicator 72 as the gimbal 22 precesses through the influence of the torquing means 64 and the engaged stop 38 and spring 37. As the member 15 levels, the output of the reference 63 goes to zero and the pointer of the null level indicator 72 goes from a position (N+) indicating to the human operator holding knob 43 that the north end of the member 15 is tilted high to null. As the pointer of the indicator 72 aproaches null to show the operator that the member 15 is reaching a substantially level condition about axis X—X, the knob 43 is released to open the switch 45 controlling the reversible biasing input circuit. When the biasing input circuit is open, the device is restored to normal operation with the servomotor 29 under control of the pick-off 28. Final levelling is effected automatically through the input to the torque means 64 from the gravity reference 63. In the improved device, both orientation and levelling of the directive member 15 is accomplished with the rotor 16 spinning and without opening the circuit between the pick-off 28 and follow-up servomotor 29.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. In a gyroscopic compass of the character including a directive member having a rotor spinning about a first normally horizontal axis, a gimbal on which the member is mounted with freedom about a first normally vertical axis, a ring on which the gimbal is mounted with freedom about a second normally horizontal axis, and a frame on which the ring is mounted to move about a second normally vertical axis, means including a pick-off between the member and gimbal and a sevomotor operatively connected to the ring for moving the ring in follow-up relation to the member; normally angularly displaced spring and stop parts on the member and gimbal arranged in engageable relation to precess the member about the axis of the gimbal; normally angularly displaced spring and stop parts on the gimbal and ring arranged in engageable relation to precess the member about its axis; means for orienting and levelling the directive member of the compass under start-up conditions including means providing a reversible biasing input to said servomotor to sequentially displace the respective spring and stop parts on the member and gimbal and gimbal and ring into engagement and thereby initially precess the member from a level condition about the axis of the gimbal and secondly precess the member to an oriented condition about its axis, and means operable upon reversal of the biasing input for levelling the oriented member about the axis of the gimbal.

2. A gyroscopic compass as claimed in claim 1, in which said biasing input means includes reversing means having a manually operable part movable between alternate positions from a null position to effect clockwise or counterclockwise precession of the member to an oriented condition.

3. A gyroscopic compass as claimed in claim 1, in which said levelling means includes a gravity reference device with an output depending on the tilt of the member about the axis of the gimbal.

4. A gyroscopic compass as claimed in claim 1, in which said follow-up means includes an electrical circuit in which the servomotor is responsive to the output of the pick-off, and the biasing input means includes an electrical circuit connected to the servomotor in series relation with the pick-off.

5. In a gyroscopic compass of the character including a member having a rotor spinning about a north-south directed axis in a normally horizontal plane, a gimbal on which the member is mounted with freedom about a first normally vertical axis, a ring on which the gimbal is mounted with freedom about a normally horizontal axis, a frame on which the ring is mounted to move about a second normally vertical axis, a follow-up circuit including an electrical pick-off having a part on the gimbal and a part on the member and an electrical servomotor connected to move the ring in accordance with the output of the pick-off; normally angularly displaced spring and stop parts on the member and gimbal arranged in engageable relation to precess the member about the axis of the gimbal; normally angularly displaced spring and stop parts on the gimbal and ring arranged in engageable relation to precess the member about its axis; means for orienting and levelling the rotor member of the compass under start-up conditions including electrical means providing a reversible biasing input to the follow-up servomotor to sequentially displace the member and gimbal spring and stop parts and the gimbal and ring spring and stop parts, and thereby initially precess the member from a level condition about the axis of the gimbal and secondly precess the member to an oriented condition about its axis; and means operable upon reversal of the biasing input for exerting a torque about the axis of the member depending on its tilt about the gimbal axis to level the oriented member with respect to the gimbal axis.

6. A gyroscopic compass as claimed in claim 5, in which the biasing electrical means includes a circuit having an input reversing switch with a manually movable part for closing the circuit in alternative operating positions and opening the circuit in a null position.

7. A gyroscopic compass as claimed in claim 5, in which the levelling means includes an electrolytic level fixedly mounted on the gimbal providing an electrical output depending on the tilt of the gimbal about its axis, and an electrical torquing means operated by the output of the level having a part fixedly connected to the gimbal and a part fixedly connected to the member.

8. A combination for orienting and levelling the directive member of a gyroscopic compass during start-up conditions in which the compass includes a ring movable about a vertical axis, means for connecting the member to the ring in follow-up relation having a servomotor connected to move the ring about its axis, a gimbal mounted on the ring with freedom about a normally horizontal axis on which the member is mounted with freedom about a normally vertical axis; first normally ineffective means for precessing the member about the gimbal axis; second normally ineffective means for precessing the member about its axis; and means providing a reversible biasing input to the servomotor for rendering said first and second precessing means effective sequentially to initially precess the member to a tilted condition about the axis of the gimbal and secondly precess the member about its axis to an oriented condition, and means operable upon reversal of the biasing input for levelling the oriented member about the axis of the gimbal.

9. A combination as claimed in claim 8, in which said biasing input means includes a reversing means having a manually operable part movable between positions that alternately effect clockwise or counterclockwise precession of the member to an oriented condition.

10. In a combination for orienting the directive member of a gyroscopic compass during start-up conditions in which the compass includes a ring movable about a vertical axis, means for connecting the member to the ring in follow-up relation having a servomotor connected to move the ring about its axis, a gimbal mounted on the ring with freedom about a normally horizontal axis on which the member is mounted with freedom about a normally vertical axis; first normally ineffective means for precessing the member about the gimbal axis; second normally ineffective means for precessing the member about its axis; and means providing a reversible biasing input to the servomotor for rendering said first and second precessing means effective sequentially to initially precess the member to a tilted condition about the axis of the gimbal and secondly precess the member about its axis to an oriented condition.

No references cited.

ROBERT B. HULL, *Primary Examiner.*